(12) United States Patent
Sirotkovic et al.

(10) Patent No.: US 10,803,055 B2
(45) Date of Patent: Oct. 13, 2020

(54) COGNITIVE SEARCHES BASED ON DEEP-LEARNING NEURAL NETWORKS

(71) Applicant: Accenture Global Solutions Limited, Dublin (IE)

(72) Inventors: Jadran Sirotkovic, Dublin (IE); Nicholas McCarthy, Dublin (IE)

(73) Assignee: Accenture Global Solutions Limited, Dublin (IE)

(*) Notice: Subject to any disclaimer, the term of this patent is extended or adjusted under 35 U.S.C. 154(b) by 229 days.

(21) Appl. No.: 15/843,892

(22) Filed: Dec. 15, 2017

(65) Prior Publication Data

US 2019/0188295 A1 Jun. 20, 2019

(51) Int. Cl.
*G06F 16/242* (2019.01)
*G06N 3/08* (2006.01)
*G06F 16/31* (2019.01)

(52) U.S. Cl.
CPC ........ *G06F 16/2425* (2019.01); *G06F 16/313* (2019.01); *G06N 3/08* (2013.01)

(58) Field of Classification Search
CPC .................................................. G06F 16/2425
See application file for complete search history.

(56) References Cited

U.S. PATENT DOCUMENTS

2019/0156206 A1* 5/2019 Graham ............ G06F 16/90335

OTHER PUBLICATIONS

Zamani et al., Neural Ranking Model with Multiple Document Fields, 2017 (Year: 2017).*

* cited by examiner

*Primary Examiner* — Dawaune A Conyers
(74) *Attorney, Agent, or Firm* — Brinks Gilson & Lione (57) ABSTRACT

This disclosure relates to a development and application of a deep-learning neural network (DNN) model for identifying relevance of an information item returned by a search engine in response to a search query by a user, with respect to the search query and a profile for the user. The DNN model includes a set of neural networks arranged to learn correlations between queries, search results, and user profiles using dense numerical word or character embeddings and based on training targets derived from a historical search log containing queries, search results, and user-click data. The DNN model help identifying search results that are relevant to users according to their profiles.

29 Claims, 7 Drawing Sheets

COGNITIVE SEARCHES BASED ON DEEP-LEARNING NEURAL NETWORKS

TECHNICAL FIELD

This disclosure relates generally to information search processing and particularly to cognitive, contextual, and adaptive searches based on deep-learning neural networks (DNN).

BACKGROUND

Electronic information search and retrieval based on keyword matching between a search query and information sources does not provide user adaptability. In other words, search results from a search engine based on keyword matching alone are scored and ranked irrespective of any characteristics or profile of a user issuing the search query. The same search query thus deterministically yields a same list of search results for different users having different profiles. Further, information search and retrieval based solely on keyword matching does not effectively take into consideration any contextual relationship between words in a search query text and words in texts associated with the search results. The list of search results returned by such a search engine in response to the search query is often of low relevancy even with high degrees of keyword matching. Providing low-relevance information leads to waste of human and computing resources.

DETAILED DESCRIPTION

An electronic search engine may be configured to compare keywords in a user-generated search query with information sources or indexes of information sources to extract matching information items. The extracted information items (alternatively referred to as data items or data elements) may be given search engine scores or rankings according to a degree of matching. The search engine may provide to the user a list of excerpts of and links to the matching information items in an order determined by the search engine scores and rankings. The user may then select, according the list of excerpts, a specific information item to follow a link for accessing further details of the selected information item.

The search engine described above may thus be indifferent to user characteristics that are usually not explicitly embedded in the search query. As such, the search engine, when processing a same search query against a same set of information resources from users of different characteristics and profiles may deterministically return a same set of identically ranked matching information items. In practice, a same term or word or a same combination of terms or words in a search query may carry different search intent by different users of the search engine. For example, a query containing the word "Apple" may be intended by an information technology personnel of a food processing enterprise to obtain from the search engine a list of information items related to computing devices or services provided by Apple, Inc., while the same query may be intended by a food product line manager of the food processing enterprise to obtain, from the search engine, information items related to apples as a fruit. Because the search engine does not take into consideration any user profiles, it may not be capable of ascertaining or predicting any user intent and thus unable to return adaptively matching and ordered information items according to user profiles.

Further, a search intended by a user and carried in search terms or words in a search query may depend on contextual relationship between the search terms and words. Such intention may not be captured by simple keyword matching. The same contextual information may further reflects different search intent by users of different characteristics and profiles. Search engines based on keyword matching thus do not return sufficiently accurate list of information items with adaptive ranking and order in response a search query by a user of a particular profile. Providing information items that are impertinent or listing information items in an inappropriate order may lead to waste of both human and computing resources.

The disclosure herein expands a search engine based on keyword matching to provide search results that are contextually, adaptively, and cognitively scored and ranked according to contextual information contained in the search query and the keyword-matched information items (alternatively referred to as data items or data elements) returned by the search engine and according to a profile of a user issuing the search query. The underlying principles and the exemplary implementations disclosed below, however, are not limited to augmenting search engines based on keyword matching. Any other types of search engine may be improved upon using the disclosed principles.

In particular, the search query, the user profile, and each information item returned by the search engine are processed using a composite deep-learning neural network (DNN) model including multiple cascading neural networks separately or jointly trained on a historical search log containing user-click data of the search engine curated and pre-processed to provide a balanced training and testing data corpus having reduced user click noises. The output of the composite DNN model includes a relevance score of each information item returned by the search engine with respect to the user profile and contextual information contained in the search query and the information item. For example, the DNN may be trained to capture subtle word level semantic relationships and character level correlations between the search query and the information item using multiple sets of hierarchically arranged or cascading neural networks based on dense numerical representations of words in the search query and words or characters in the information item. The DNN is further trained with the historical search log to capture relationships and similarities between various user profiles by representing user profiles using a dense numerical category embedding, and to evaluate the semantic relationships and correlation between the search query and the information item in view of the user profile to obtain the relevance score for the information item. As such, a same information item returned by the search engine in response to the same search query might be given different relevancy scores when evaluated for different user profiles. This results in a contextual, adaptive, and personalized experience for different users or user groups.

Figure 1:
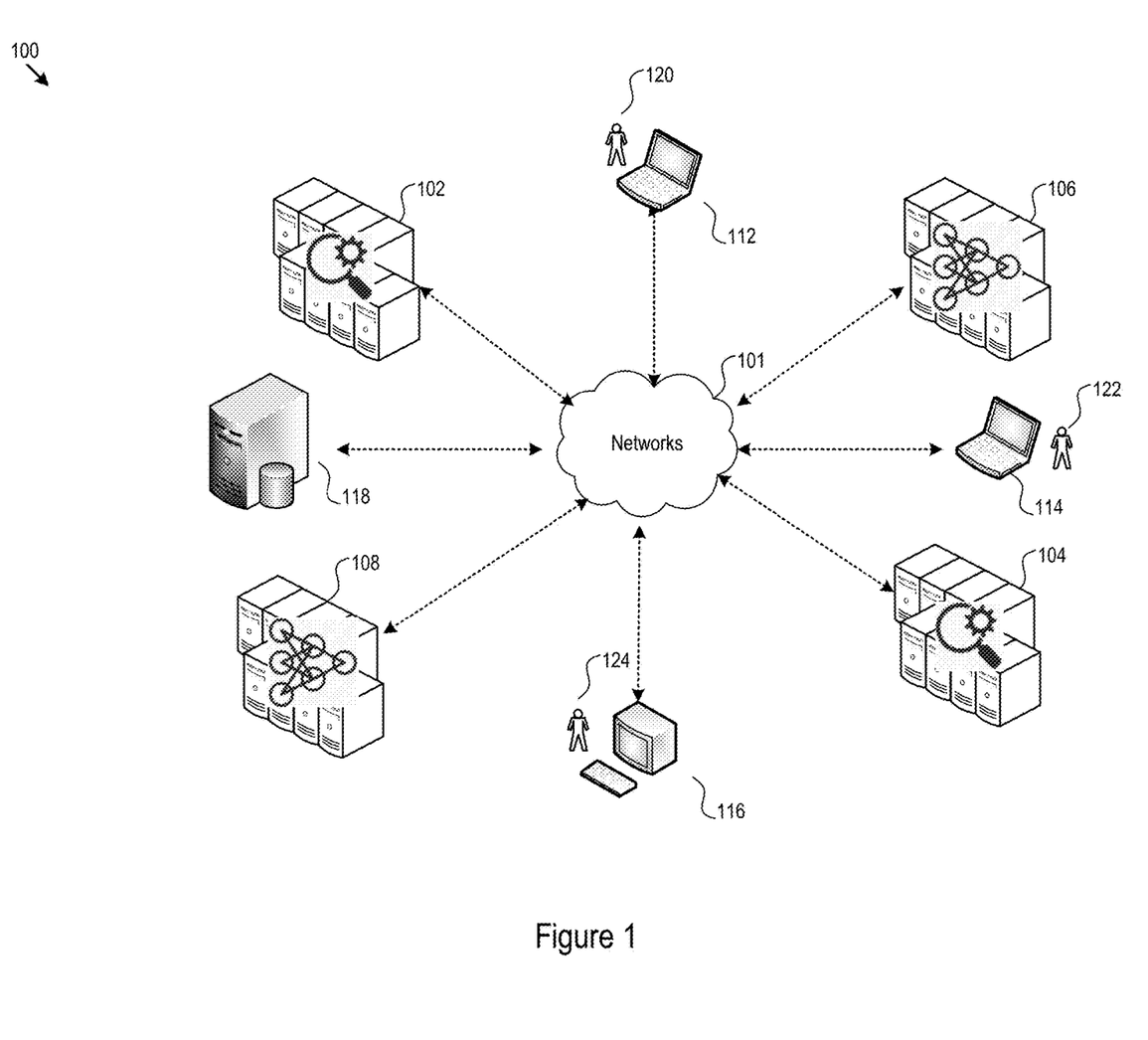
FIG. 1 shows an exemplary electronic communication environment for implementing contextual, adaptive, and cognitive searches of information items based on DNN.

FIG. 1 shows an exemplary electronic communication environment 100 in which adaptive searches based on DNN may be implemented. The electronic communication environment 100 may include one or more search engines 102 and 104, one or more DNN engines 106 and 108, one or more user devices 112, 114, and 116 associated with users 120, 122, and 124, and one or more databases 118, in communication with each other via public or private communication networks 101. The search engines 102 and 104 may be implemented as a central server or a plurality of servers distributed in the communication networks. Likewise, the DNN engines 106 and 108 may be implemented as a central server or distribute servers. While the search engines 102 and 104, and DNN engines 106 and 108 are shown in FIG. 1 as implemented as separate servers, they may be alternatively combined in a single server or single group of distributed servers combining the search functionality and DNN functionality for processing the search results returned by the search engine. Further, the DNN engines may include modeling servers for running codes or scripts for training the DNN model, and separate adaptive search servers for hosted a search service that interfaces with the search engines, the users, and the DNN modeling servers to provide contextual and adaptive searches to the users. The user devices 112, 114, and 116 may be any form of mobile or fixed electronic devices including but not limited to desktop personal computer, laptop computers, tablets, mobile phones, personal digital assistants, and the like. The user devices 112, 114, and 116 may be installed with a user interface for accessing the search engines and or the DNN engines. The one or more database 118 of FIG. 1 may be hosted in a central database server or a plurality of distributed database servers. The database 118 may be organized and implemented in any form, including but not limited to relational database containing data tables, graphic database containing nodes and relationships, and the like. The database 118 may be configured to store the search logs and other data need for developing and using the DNN model.

Figure 2:
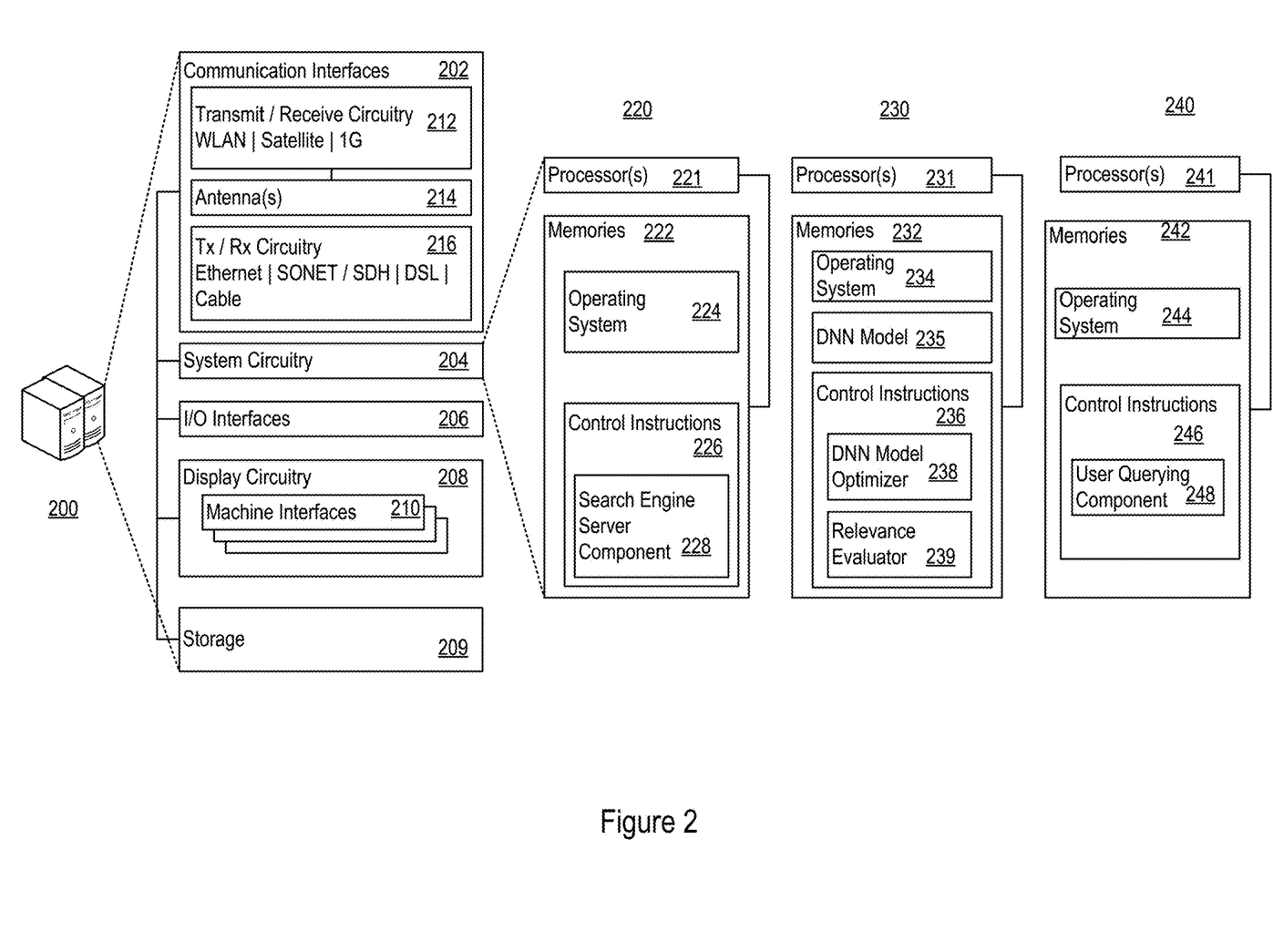
FIG. 2 illustrates computer systems that may be used to implement various components of the electronic communication environment of FIG. 1.

FIG. 2 shows an exemplary computer system 200 for implementing the search engines 102 and 104, the DNN engines 106 and 108 (including the modeling servers and the adaptive search servers), or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or model for querying, searching, and for training the DNN. The storage 209 may further store data corpus used for developing and training the DNN model for adaptive searches. These data corpus may alternatively be stored in the database 118 of FIG. 1. In one implementation, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality related to querying, searching, and DNN functionalities of the search engines, the DNN engines, and the user devices.

For example, the system circuitry 204 may be implemented as 220 for the search engines 102 and 104 of FIG. 1. The system circuitry 220 of the search engines may include one or more instruction processors 221 and memories 222. The memories 222 stores, for example, control instructions 226 and an operating system 224. The control instructions 226, for example may include instructions for implementing the search engine server component 228. In one implementation, the instruction processors 221 execute the control instructions 226 and the operating system 224 to carry out any desired functionality related to the search engines.

Likewise, the system circuitry 204 may be implemented as 230 for the DNN engines 106 and 108 of FIG. 1 (including the modeling servers and the adaptive search servers). The system circuitry 230 of the DNN engines may include one or more instruction processors 231 and memories 232. The memories 232 stores, for example, control instructions 236 and an operating system 234. The control instructions 236 for the DNN engines may include instructions for implementing a DNN model optimizer 238 and a relevance evaluator 239 that uses the trained DNN model. In one implementation, the instruction processors 231 execute the control instructions 236 and the operating system 234 to carry out any desired functionality related to the DNN engines. The memories 232 may further store a DNN model 235 generated by the DNN model Optimizer 238.

For another example, the system circuitry 204 may be implemented as 240 for the user devices 112, 114, and 116 of FIG. 1. The system circuitry 240 of the user devices may include one or more instruction processors 241 and memories 242. The memories 242 stores, for example, control instructions 246 and an operating system 244. The control instructions 246 for the user devices may include instructions for implementing a user querying component 248 (alternatively referred to as a user search interface). In one implementation, the instruction processors 241 execute the control instructions 246 and the operating system 244 to carry out any desired functionality related to the user devices.

Figure 3:
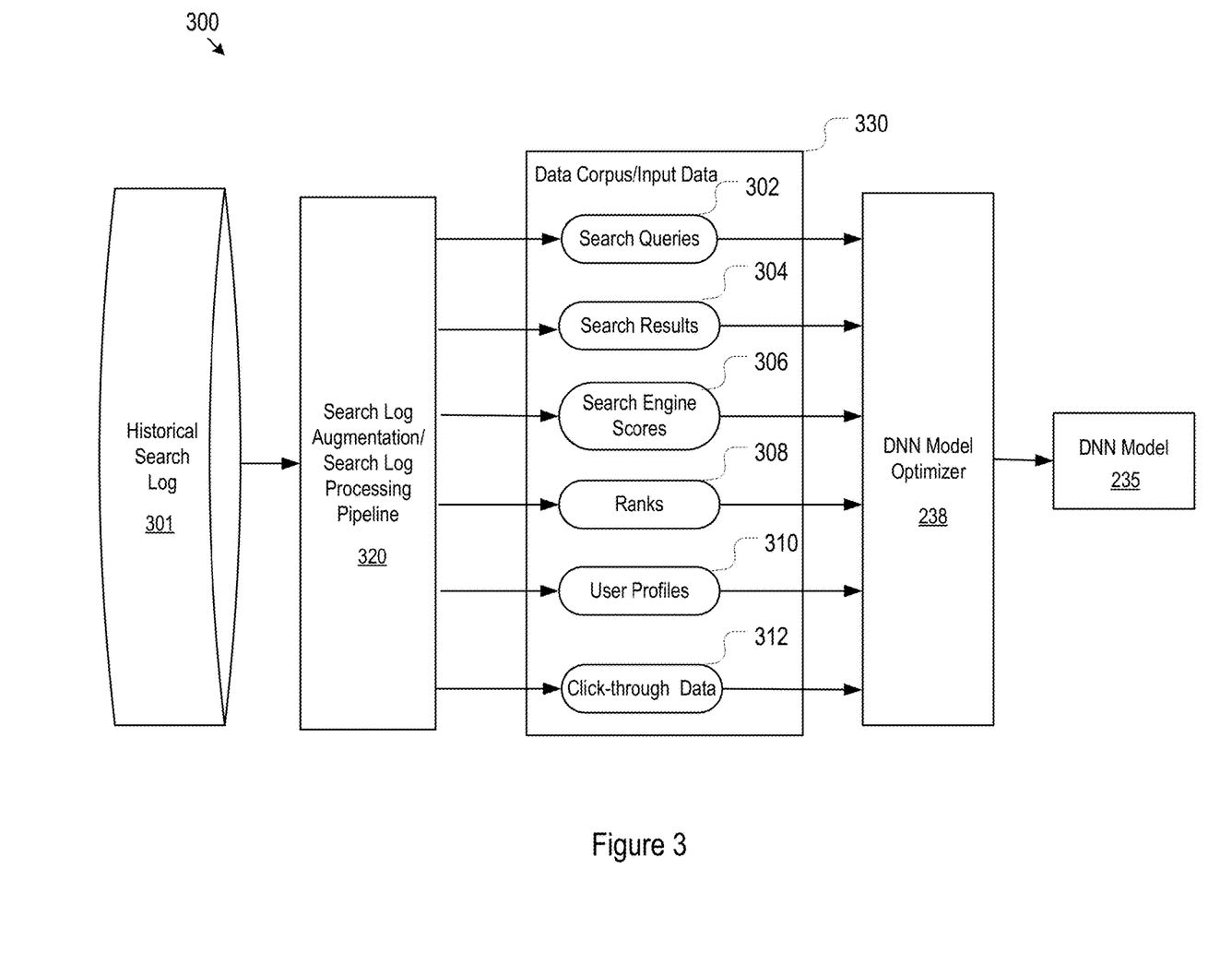
FIG. 3 illustrates a data flow for an exemplary implementation for training a DNN model for contextually, adaptively, and cognitively processing electronic searches.

FIG. 3 shows an exemplary data flow 300 for training a DNN model 235 for contextual and adaptive searches as implemented by the DNN model optimizer 238 of the DNN engines. The training of the DNN model 235 is based on data corpus or input data 330. The data corpus 330 may be generated from a historical search log 301 of the search engines of FIGS. 1 and 2. The historical search log 301 may contain historical search queries, historical search results, historical user profiles corresponding to users issuing the historical search queries, and historical user-click data. In the description below, the term "historical" may be omitted form the data contained in the historical search log 301. The data corpus 330 may contain augmented data in addition to the data directly extracted from the historical search log 301. In particular, the historical search log 301 maybe augmented and pre-processed by the search log augmentation ad preprocessing pipeline 320. The input data or data corpus 330 to the DNN model optimizer 238 may include historical search queries 302, historical search results 304 returned from the search engine in response to the historical search queries, historical search engine scores 306 and ranks 308 for the historical search results, user profiles 310 for users issuing the historical queries to the search engine, and historical user-click data 312 by users with respect to the search results. The input historical data 302-310 may be used in various training stages of the DNN model 235. The corresponding user-click data 312 may be used as labels to indicate whether a particular search result or information item is relevant or irrelevant to a corresponding search query and user profile combination. The data corpus 330 augmented and processed from the historical search log 301 via the search log augmentation and processing pipeline 320 may be split into a training dataset and test dataset, or alternatively split into a training dataset, a test dataset, and a validation dataset. For example, the size ratio between the training, test, and validation datasets may be chosen to be 0.8./0.15/0.05, or any other suitable ratios. In one implementation, the DNN model 235 may be trained for use within an enterprise. As such, the historical search log may be collected by the search engines from users of various profiles within the enterprise across various organizations and user groups and used for generating the data corpus 330.

The historical search log 301 of the search engine may contain all historical query user pairs but may only contain search results that are of interest and are clicked by the users. The historical search log 301 thus may be imbalanced in that it may only provide positive click samples to the data corpus 330. Part of the functionality of the search log augmentation and processing pipeline 320 is to augment and process the data in the historical search log 301 to form a balanced data corpus 330 for training the DNN model 235. In one implementation, the queries contained in the historical search log 301 may be rerun by the search engine as dictated by the search log augmentation and processing pipeline 320 to provide search results that were not clicked by the users and thus were not included in the historical search log 301. These search results are critical because they provide negative samples in the data corpus 330. For establish a balanced data corpus 330, a predetermined number of negative samples may be included for every positive click sample. The predetermined number may be chosen to be, e.g., between 2-20, or any other suitable number, depending on the size of the training dataset. For example, the predetermined number may be chosen to be between 2-5 for large datasets and between 5-20 for small datasets. In one implementation, the predetermined number of negative samples may be randomly selected by the search log augmentation and processing pipeline 320 from the unclicked rerun search results for each query-user pair.

The search log augmentation and processing pipeline 320 may further provide other functions. For example, the search log augmentation and processing pipeline 320 may further filter the user-click data to obtain data corpus 330 with reduced noise. In particular, for a same query, different users often choose to click on very different documents. It is thus often not possible to explain this with user profile information alone. In one implementation, a click threshold may be applied to the user-click data. Specifically, only query-document pairs that are clicked at a higher number than the click threshold may be included as positive click samples in the data corpus 330 and may be further rerun to generate corresponding negative samples of the data corpus 330. Query-document pairs with clicks that are less than the click threshold may be filtered and removed by the search log augmentation and processing pipeline 320 from the data corpus 330.

The search log augmentation and processing pipeline 320 may further augment the search result ranks 308, search engine scores for search results 304, and user profiles 310. The user profiles, for example, may be obtained by keying an external database containing user profile information off the recorded user identification information in the historical search log 301. Data items or categories in a user profile may be predefined and may, in e.g., an enterprise setting, include but are not limited to career level information, salary grade information, job role information, geographic location, home country information, and specialty information.

Figure 4:
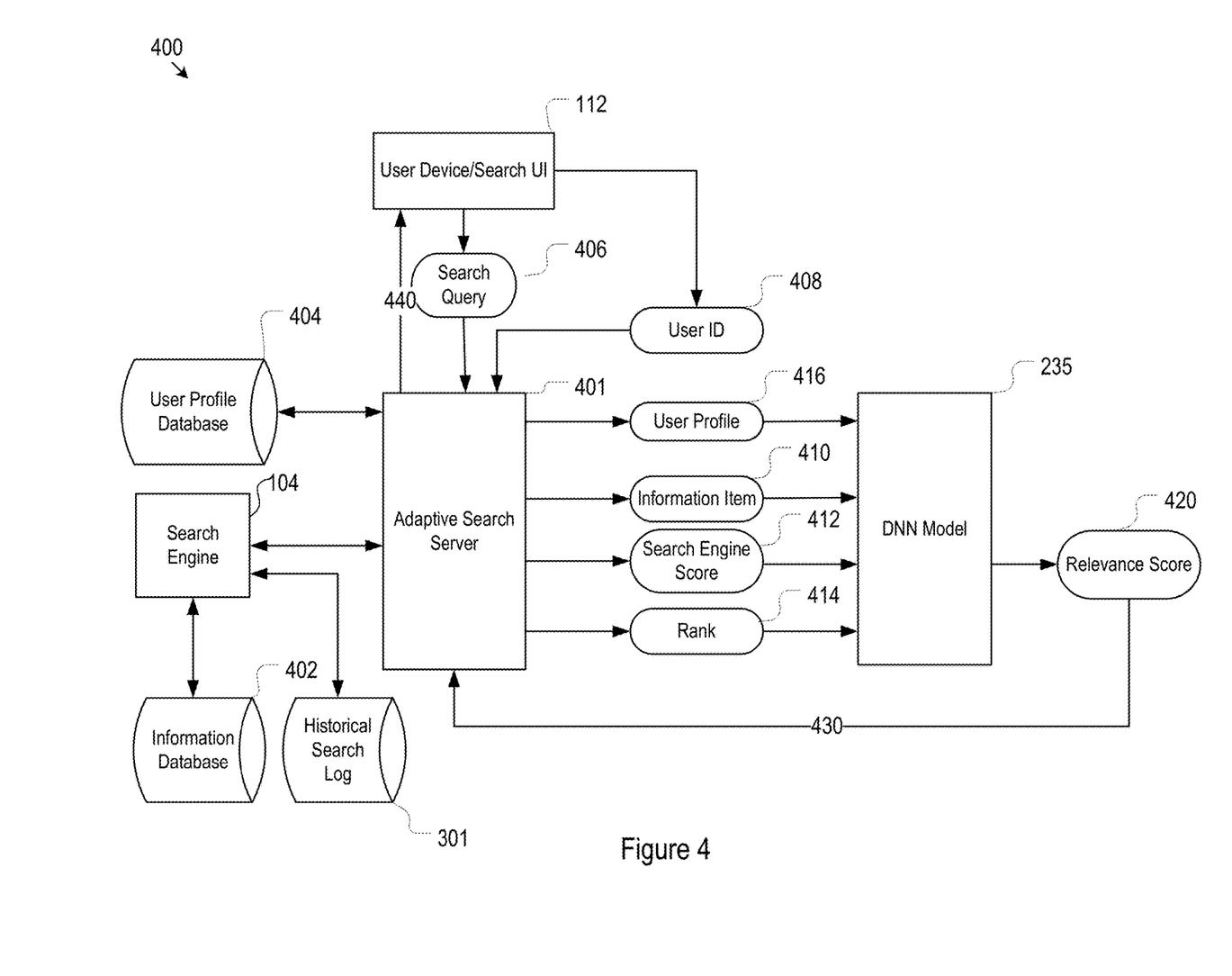
FIG. 4 illustrates an exemplary data flow for processing electronic searches using the DNN model established in FIG. 3.

FIG. 4 shows an exemplary data flow 400 for processing electronic searches using the trained DNN model 235. In particular, a user may submit a search query 406 and a user ID 408 via a user device 112 (having a user interface for contextual and adaptive searching) to the adaptive search server 401. The adaptive search server 401 may pass the search query to the search engine 104. The search engine 104 runs a search in response to the search query 406 against the information database 402 using, for example, normal keyword matching, and returns, from the information database 402, a set of search results in the form a set of information items. Each information item may be provided with a rank and a score according to the degree of keyword matching. The search engine 104 may be further responsible for updating the historical search log 301 with new user-click data. The user ID 408 associated with the search query 406 may be used by the adaptive search server 401 to obtain a user profile 416 from the user profile database 404. The user profile 416, and each information item 410, search engine score 412 and rank 414 for the information item may be input into the trained DNN model 235 to obtain an adaptive and contextual relevance score 420 for the information item 410 with respect to the contextual information in the query and the user profile 416.

Continuing with FIG. 4 and in one implementation, the relevance scores 420 for a plurality of information items returned by the search engine may be generated by the DNN model 235 and returned to the adaptive search server 401, as shown by the arrow 430. The adaptive search server 430 may order and/or filter the information items according to the relevance scores and control a presentation of the information item to the user device 112, as illustrated by arrow 440. For example, the adaptive search server 430 may present a predetermined number of information items in descending order of the relevance scores to the user.

Figure 5:
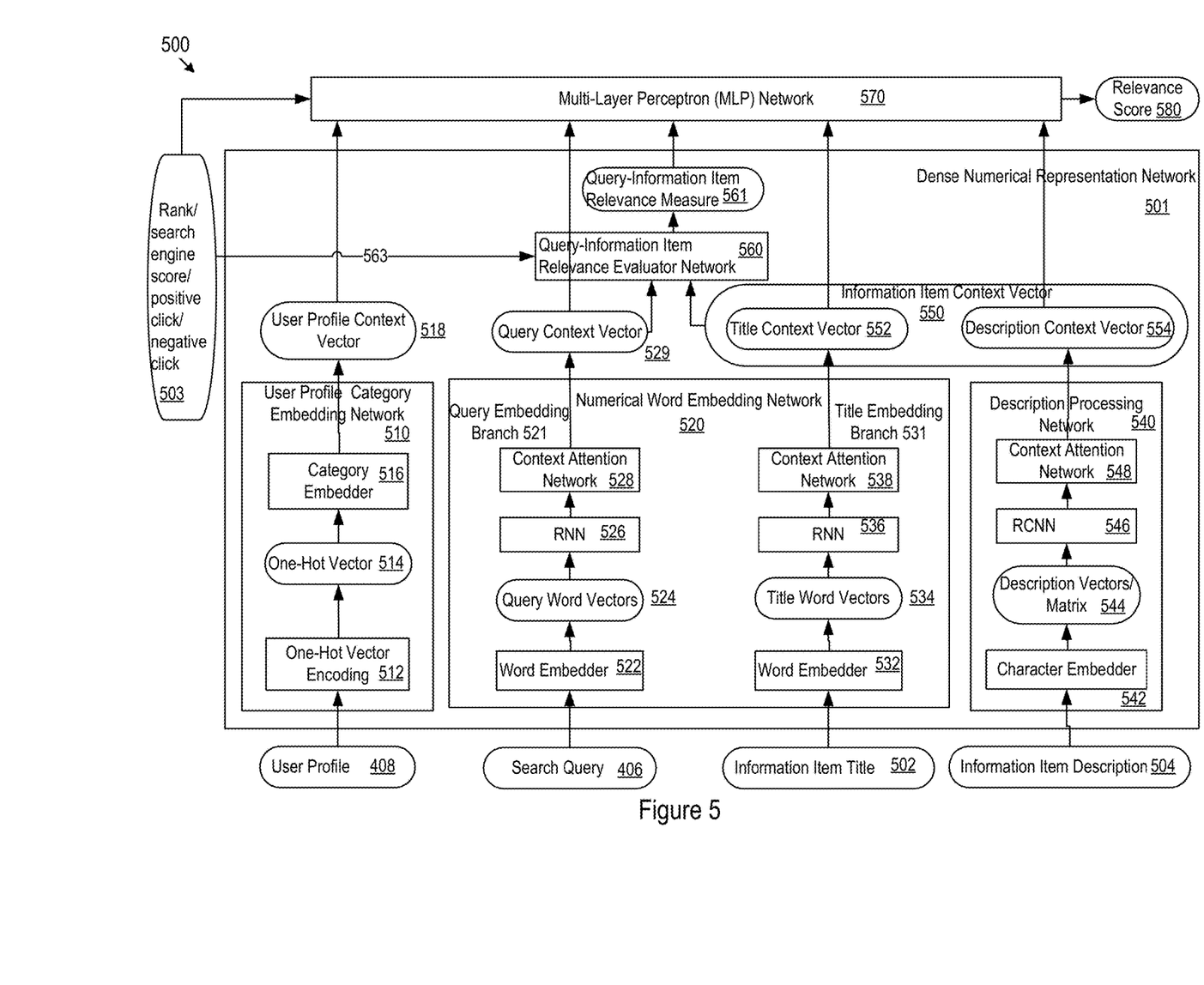
FIG. 5 illustrates a data and logic flow for an exemplary implementation of a DNN model for contextually, adaptively, and cognitively processing electronic searches.

FIG. 5 shows an exemplary logic and data flow 500 of the DNN model 235 of FIGS. 3 and 4. The process for training of the DNN model 235 and the process for using the trained DNN model to obtain adaptive and contextual relevance scores for information items may both be illustrated in view of the data and logic flow 500.

The DNN model 235, as illustrated by the data and logic flow 500, may include a dense numerical representation network 501 and a multi-layer perceptron (MLP) network 570. The dense numerical representation network 501 may further include, hierarchically or in a cascading manner, a user profile category embedding network 510, a numerical word embedding network 520, a description processing network 540, and a query-information item relevance evaluator network 560.

The input to the logic and data flow 500 includes user profile 408, search query 406, and information item represented by information item title 502, information item description 504, and data 503 containing information item search engine rank/score/positive click data/negative click data. In the illustration of the logic and data flow 500, although these input items are each specified in a singular form, input items associated with a plurality of information items may be input sequentially or as a batch. For example, input items associated with a large number of information items may be required during the training process of the DNN model 235 and may be input as a series for optimizing training parameters of the DNN model 235 in forward and backward propagation processes.

The user profile 408 may be of any data structure containing predefined user profile categories. Each search query 406, each information title 502, and each information item description 504 may include a series of words, each containing at least one character, delineated by spaces, punctuations, or other delineating symbols. In the context of a language not based on alphabets, the delineation of words and characters may be predefined in any appropriate manner. For example, Chinese are based on calligraphy comprising collection of symbols each containing strokes. In one implementation for searches based on Chinese, each individual symbol may be equated with a character and common combinations of symbols may be equated with a word. In another alternative implementation, each stroke may be equated with a character whereas each symbol may be equated with a word. For some symbol-based languages, the symbols may not be separated by spaces.

As shown by the logic and data flow 500 of FIG. 5, the user profile 408, the search query 406, the information item title 502, and the information item description 504 are processed by the user profile category embedding network 510, a query embedding branch 521 of the numerical word embedding network 520, a title embedding branch 531 of the numerical word embedding network 520, and the description processing network 540, respectively, to obtain a user profile context vector 518, a query context vector 529, a title context vector 552, and a description context vector 554. The title context vector 552 and the description context vector 554 may be further concatenated into a single information item context vector 550. These context vectors may be dense numerical representations of the inputs 406, 408, 502 and 504. These vectors are contextual because the various embeddings and networks 510, 520, and 540 are capable of learning relationship between user profile categories, between words, or between characters. Each of these context vectors may be of a predetermined dimension. The dimensions of these context vectors may be determined such that they provide a trained DNN model with sufficient predictive accuracy. The context vectors of different types (user profile, query, information item title, or information item description) may be of a same dimension or of different dimensions. The context vectors may be numerical rather than binary, e.g., each dimension of the context vectors are represented by a numerical value. Representing the input data items numerically rather than as binary data structures help reduce the vector dimensions and computation complexity needed to develop an accurate DNN model and help render the context vectors dense. Distance between context vectors of each type of context vectors may be defined. The distance, for example, may be specified as a cosine distance between numerical context vectors. Such a distance may represent a degree of similarity between the context vectors. For example, a small distance between context vectors of two user profiles may indicate that the two user profiles are similar. The data and logic flow 500, in part, is capable of training the DNN model to learn relationships between user profiles, relationships between the search queries, the relationships between the information items to embed them into the dense numerical contextual representations 518, 529, 552, and 554.

The user profile category embedding network 510 converts the user profile input 408 into the user profile context vector 518. The user profile category embedding network 510 may include a one-hot vector encoder 512 to obtain one-hot vector 514 and a category embedder 516 to embed the one-hot vector 514 into the user profile context vector 518. The one hot vector 514 may be binary. For example, each user profile may contain a predetermined set of categories and a category may have $c_{up}$ possible values and thus may be represented by a binary one-hot vector of dimension $c_{up}$. For embedding the one-hot vector 514 for the user profile 408 into the user profile context vector 518 by the category embedder 516, a set of trainable user profile parameters $T_{up}$ may be used. These trainable parameters may be learned jointly with other trainable parameters of the DNN model during the training process using the data corpus labeled by the positive and negative user clicks.

In one implementation, the numerical word embedding network 520 may include two separate but similar branches 521 and 531, with independent trainable parameters, for embedding the search query 406 and the information item title 501 into the query context vector 529 and the title context vector 552. Each of the branches 521 and 531 may contain a cascading embedding network including a word embedder 522/532, a recurrent neural network 526/536, and a context attention network 528/538. The word embedders 522 and 532 may be responsible for embedding each individual word of the search query 406 or the information item title 502 into a dense numerical word vector 524 or 534 based on vocabulary items and learned correlations between the vocabulary items for the query and the information item title, rather than into a high-dimensional binary vector having a dimension of a size of the vocabulary items and containing no information about the correlations between the vocabulary items. For example, the word embedder 522/532 may be implemented as a word2vec embedder. The output of the word embedder 522/532 thus may be a set of query word vectors 524 or title word vectors 534 for the search query 406 and the information item title 502.

The RNN network 526/536 of the numerical word embedding network 520 processes the word vectors 524/534 of the input search query 406 of the information item title 502 in sequence and further learns correlations between the words in the sequence of word vectors to produce, e.g., various hidden states, which are then processed by the context attention network 528/538 to obtain the query context vector 529 and the title context vector 552. The context attention network 528/538, as will be described in more detail below, may be configured to determine the most important segment of the query or information item title rather than every word and to reduce the complexity of the DNN model. The context attention network 528/538 may be optionally or may be included as part of the RNN network 526/536. The dimensions of the resulting query context vector 529 and the title context vector 552 may, in one implementation, be smaller than the dimension of the word vectors 524/534. The RNN network 526/536 and the context attention network 528/538 may include a plurality of trainable parameters that may be learned in the training process of the DNN model. These trainable parameters are collectively referred to as $T_{word}$.

Continuing with FIG. 5 and in one implementation, the information item description 504 may be processed by the description processing network 540, which may, for example, include a character embedder 542, a recurrent convolutional neural network (RCNN) 546, and a context attention network 548 in tandem. The input information item description 504 as a sequence of characters may be converted by the character embedder 542 into binary description vectors 544. In one implementation, the input information item description may be padded or cropped to produce a sequence of character strings each of a predetermined length L. Each character may be converted to a binary vector with a dimension determined by a size m of a character set associated with the input information item description. For example, m may be 26 if the input information item description only contains alphabetic letters. For another example, m may be 68 for the character set of (the last period acting as a punctuation and not being part of the exemplary character set):

abcdefghijklmnopqrstuvwxyz0123456789,;.!?:"'/\|_@#$%&^*~'+-=<>()[]{}.

In some implementations, the character set above may be rearranged and then binned into m buckets. Each character of the input information item description may accordingly be embedded into an m dimension one-hot vector. Each character in the same bucket may be encoded into the same one-hot vector. The binning of the character set may be based on some usages statistics of the character set and may be derived independent of the training of the DNN model. In one example, the character set above may be binned into 16 buckets. As such, each character may be embedded into a 16 dimensional rather than 68 dimensional one-hot binary vector. The binning process for the character embedding helps reduce computational complexity of the DNN model.

The input information item description 504 may thus be converted into L binary description vectors 544 each of dimension m, or alternatively an L by m binary description matrix, also referred to as 544. The sequence of the binary description vectors 544 may be input into the RCNN network 546 and the context attention network 548 to obtain the numerical description context vector 554. The context attention network 548 may function under similar principle described above for the context attention networks 528 and 538. The context attention network 548 may be optionally or may be included as part of the RCNN network 546. The input to the context attention network 548 is derived from the RCNN 546. The trainable parameters associated with the RCNN 544 and the context attention network 548 may be collectively referred to as $T_{Char}$. An exemplary implementation of the RCNN 546 will be described below in relation to FIG. 7.

While the implementation of FIG. 5 calls for a word embedding for the input search query 406 and information item title 502, but character embedding for information item description 504, other embodiments may not be so limited. For example, any of the search inputs 406, 502, 504 may be processed using any of the processing branches 521/531 and 540, e.g., the search query 406 and the information item title 502 may be processed based on character embedding and the information item description 504 may be processed based on word embedding. Accordingly, the RNN network 526/530 may be alternatively implemented as a RCNN network. Likewise, the RCNN 546 may be alternatively implemented as a RNN network only.

Continuing with FIG. 5, the numerical title context vector 552 and the description context vector 554 described above, once concatenated into the information item context vector 550, jointly provide the information item context vector 550 as a dense contextual representation of the information item. The information item context vector 550 and the query context vector 529 may then be processed by the query-information item relevance evaluator 560 to obtain a query-information item relevance measure 561 for representing a coupling/correlation between the query and the information item title and description. The trainable parameters in the query-information item relevance evaluator 560, collectively referred to as $T_{QIR}$, for example, may be a matrix for manipulating the query context vector 529 and the information item context vector 550. As part of the training process for the DNN model, $T_{QIR}$ may be determined by maximizing the query-information relevance measure 561 between queries using target relevance measures derived from the click data of the training data corpus. As such, the query-information item relevance evaluator 560 may obtain the user-click data from the data 503, as indicated by arrow 563.

Finally for FIG. 5, as shown by the data and logic flow 500, the user profile context vector 518, the query context vector 529, the title context vector 552, the description context vector 554, the query-information item relevance measure 561 and the data 503 are input into the MLP network 570 to obtain a relevance score 580 for the information item with respect to the search query 406 and user profile 408. In one implementation, these input vectors to the MLP network 570 may be concatenated into a single vector by a concatenation layer.

The MLP network 570 may contain multiple fully connected layers of neurons (or perceptrons) including one or more hidden layers. Each layer of the fully-connected MLP network 570 computes a transformation f(x) on an input defined by:

$$f(x)=\alpha(w_h x+b),$$

where $\alpha(\ )$ is a non-linear activation function, $w_h$ is the weights vector of the hidden layer and b the bias. The final layer of an MLP network 570 may, e.g., contain a single neuron of one-dimensional vector operated by a softmax function, which squashes an one-dimensional vector of arbitrary real values to a one-dimensional vector of real values in a normalized range of [0, 1], representing the relevance score 580. The weight vectors of the fully connected MLP network 570 may be collectively referred to as trainable parameters $T_{MLP}$.

The data and logic flow 500 of FIG. 5 is applicable to both the training process of the DNN model 235 using the data corpus with respect to FIG. 3 and using the trained DNN model 235 to evaluate relevance scores of an input query and a corresponding user profile and information item. During the training process, the trainable parameters described above may be initialized, e.g., randomly, and each combination of user profile, search query, and information item in the data corpus may be input into the data and logic flow 500. The DNN model 235 is trained by, e.g., minimizing relevance score loss for those both the positive and negative samples via forward and backward propagations. The updates of the trainable parameters in the backward prorogation process may be based on, for example, gradient descent. Once the DNN model 235 is trained, i.e., all trainable parameters are optimized and determined, it may then be used to evaluate any input information item returned by the search engine in response to a search query by a user of a particular user profile. The search log of the search engine may be continuously updated. As such, the DNN model 235 may be retrained using the updated search log at any appropriate time.

In one implementation, the training of the DNN model based on the data and logic flow of FIG. 5 may be performed in separate training processes. For example, the DNN model parameters $T_{word}$, $T_{char}$, and $T_{QIR}$ associated with the numerical word embedding network 520, the description processing network 540, and the query-information item relevance evaluator network 560 may be trained first by minimizing the loss of the query-information item relevance measure 561 via forward and backward propagations through the network 520, 540, and 560. The training target of this first training process may be the query-information item relevance measure 561 which is directly related to the user-click label of the training data corpus. Once $T_{word}$, $T_{char}$, and $T_{QIR}$ are trained and fixed for the DNN model, other model parameters such as $T_{up}$ and $T_{MLP}$ associated with the user profile category embedding network 510 and the MLP network 570 may be learned in a second separate training process to minimizing loss of labeled targets associated with relevance score 580 in the training data corpus according to the user-click data.

Alternatively, the DNN model parameters including $T_{word}$, $T_{char}$, $T_{QIR}$, $T_{up}$, and $T_{MLP}$ may be trained jointly in a single training process via forward and backward propagations through the networks 510, 520, 540, 560, and 570 of FIG. 5 with joint targets of the query-information item relevance measure 561 and the relevance score 580.

Figure 6:
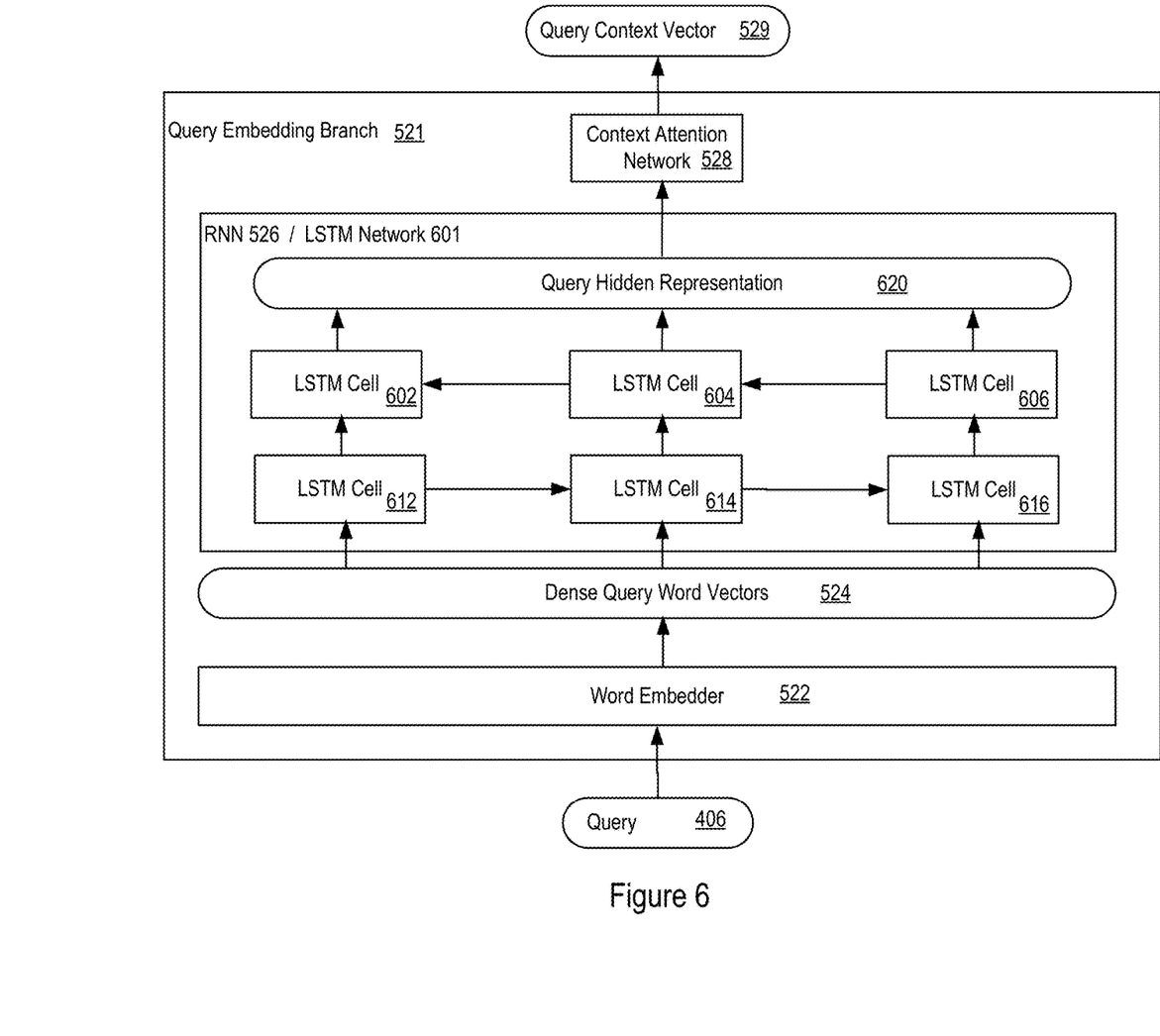
FIG. 6 illustrates a data and logic flow for embedding a search query into a representation of a dense numerical context vector.

Moving away from FIG. 5, FIG. 6 illustrates a data and logic flow for an exemplary implementation of the query embedding branch 521 of the numerical word embedding network 520, including the word embedder 522, the RNN 526, and the context attention network 528. In one implementation, the word embedder may include a dense numerical embedding network based on word2vec representation.

Each word in the query 406 can be represented by a sparse one-hot vector encoding over a vocabulary V. However, such an approach yields binary vectors of excessively large dimension and their manipulation may be prohibitively expensive if the size of V is large. Word2vec embedding implemented by the word embedder 522, on the other hand, provides a dense and real-valued numerical representation of a much lower dimension for each word of the query 406. The dimension for the dense numerical vector for a word may be predetermined or may be chosen to improve reliability of the resulting DNN model after the training process. For example, each word of the query 406 may be embedded with a dense numerical word vector of a dimension d∈[50 . . . 1000]. The output of the trained word embedder 522 thus may be a sequence of dense numerical word vectors each having a dimension d and each representing one word in the query 406.

The dense numerical query word vectors 524 may be computed using the word embedder 522. In one implementation, the word embedder 522 may be developed separately and independently from the DNN model development. As such, the training data for the word embedder 522 may be a different data corpus from that used for training the DNN model. One example of such word embedder is an independently trained word2vec embedding model using a general document corpus (rather than a data corpus associated with search queries and search results). In an alternative implementation, the training of the word embedder 522 with trainable parameters $T_{WE}$ may a joint training process with the numerical word embedding network 520, the description processing network 540, and query-information item relevance evaluator network 560 of FIG. 5 using the same search data corpus. In another alternative implementation, the trainable parameters $T_{WE}$ of the word embedder 522 may be jointly trained with the user profile category embedding network 510 and the MLP network 570 in addition to networks 520, 540, and 560.

Continuing with FIG. 6, the RNN network 526 of the query embedding branch 521 may be implemented as a long short term memory (LSTM) network 601. The LSTM network 601 adds extra hidden states and connections that help capture long and short-term dependencies in the sequence of the dense numerical query word vectors 524 of an input query 406. In one implementation and given an input word vector sequence for the query $S=(x_0, x_1, \ldots, x_T)$, where $x_t$ is the word vector for the word at position t in the input query, the LSTM defines a hidden representation 620 containing hidden states of the LSTM network 601. A hidden state $h_t$ for position t corresponding to a word at position t in the query is obtained by the LSTM network as follows:

$$i_t = \sigma(W_{hi}x_t + W_{hi}h_{t-1} + b_i),$$

$$f_t = \sigma(W_{xf}x_t + W_{hf}h_{t-1} + b_f),$$

$$c_t = f_t c_{t-1} + i_t \odot \tanh(W_{xc}x_t + W_{hc}h_{t-1} + b_c),$$

$$o_t = \sigma(W_{xo}x_t + W_{ho}h_{t-1} + b_o),$$

$$h_t = o_t \odot \tanh(c_t)$$

where $i_t$, $f_t$, $c_t$, $o_t$ are the input, forget, carry, and output gates, $\sigma$ is a non-linear activation function (e.g., a sigmoid function), $\odot$ is element-wise matrix multiplication. Parameters W and b with various subscripts, collectively denoted by $T_{LSTM}$ as part of the trainable parameters $T_{word}$ of the numerical word embedding network 520 of FIG. 5 and that may be learned during the training process of the DNN model.

In the implementation of FIG. 6, a bidirectional LSTM network is constructed by stacking two separate LSTM layers, one layer reading the input sequence forwards (including LSTM cells 612, 614, and 616), and a second layer reading the input sequence backwards (including LSTM cells 602, 604, and 606). The hidden states in the forward layer and the backward layer may be denoted by $h_t^\rightarrow$ and $h_t^\leftarrow$, respectively. The $h_t^{\rightarrow}$ and $h_t^{\leftarrow}$ may be concatenated to form the query hidden representation 620 of the input query 406, $h_t$.

In some implementation, there may be multiple pairs of LSTM layers, with the hidden states of the lower LSTM layer pair feeding to the next higher LSTM layer pair. The hidden states of the highest LSTM layer pair form the query hidden representation 620. Each LSTM layer pair may be bidirectional, e.g., including a forward LSTM layer and a backward LSTM layer.

Continuing with FIG. 6, the query hidden representation 620 of the input query may be processed by the context attention network 528 to obtain the query context vector 529, represented by C. In particular, the hidden states $h_t$ of the LSTM network 601 at position t in the sequence may be represented by:

$$h_t = f(x_t, h_{t-1})$$

The query context vector C may be generated from sequence of hidden states according to:

$$C = f(\{h_1, \ldots, h_T\})$$

The context attention network 528 for extracting information that are more important for relevance computation may, for example, be configured to process the concatenated hidden states $h_t$ of the LSTM network 601 in feedforward to obtain a representation $u_t$ corresponding to the word at position t in the input query, where $$u_t = \tanh(Wh_t + b_w)$$

The importance of the word at position t in the input query may be represented as a similarity $u_i$ and a word context vector $u_w$. The word context vector $u_w$ may be randomly initialized and jointly learned during the training process of the DNN model together with other trainable parameters W and $b_w$, for the context attention network 528, which are collectively referred to as $T_{Attn}$ as part of the trainable parameter $T_{word}$ for the numerical word embedding network 520 of FIG. 5. A normalized importance weight $\alpha_i$ associated with each word in the input query is computed using a softmax function:

$$\alpha_i = \frac{\exp(u_i^T u_w)}{\sum \exp(u_i^T u_w)}$$

The query context vector C (529) may be obtained as a sum across hidden states $h_t$ according to the importance weight $\alpha_1$.

While FIG. 6 shows an exemplary implementation of the query embedding branch 521 of the numerical word embedding network 520 of FIG. 5, the principles of the embedding branch 521 may be similarly applied to the title embedding branch 531 of the numerical word embedding network 520 of FIG. 5. The information item title 502, in a form of a sequence of words, may be processed similarly by the word embedder 532 to obtain a dense numerical title word vectors 534, and the RNN 536 to obtain hidden states of a bidirectional and optionally multi-layer-pair LSTM network. The hidden states of the LSTM network may be processed by the context attention network 548 to obtain the description context vector 554.

Figure 7:
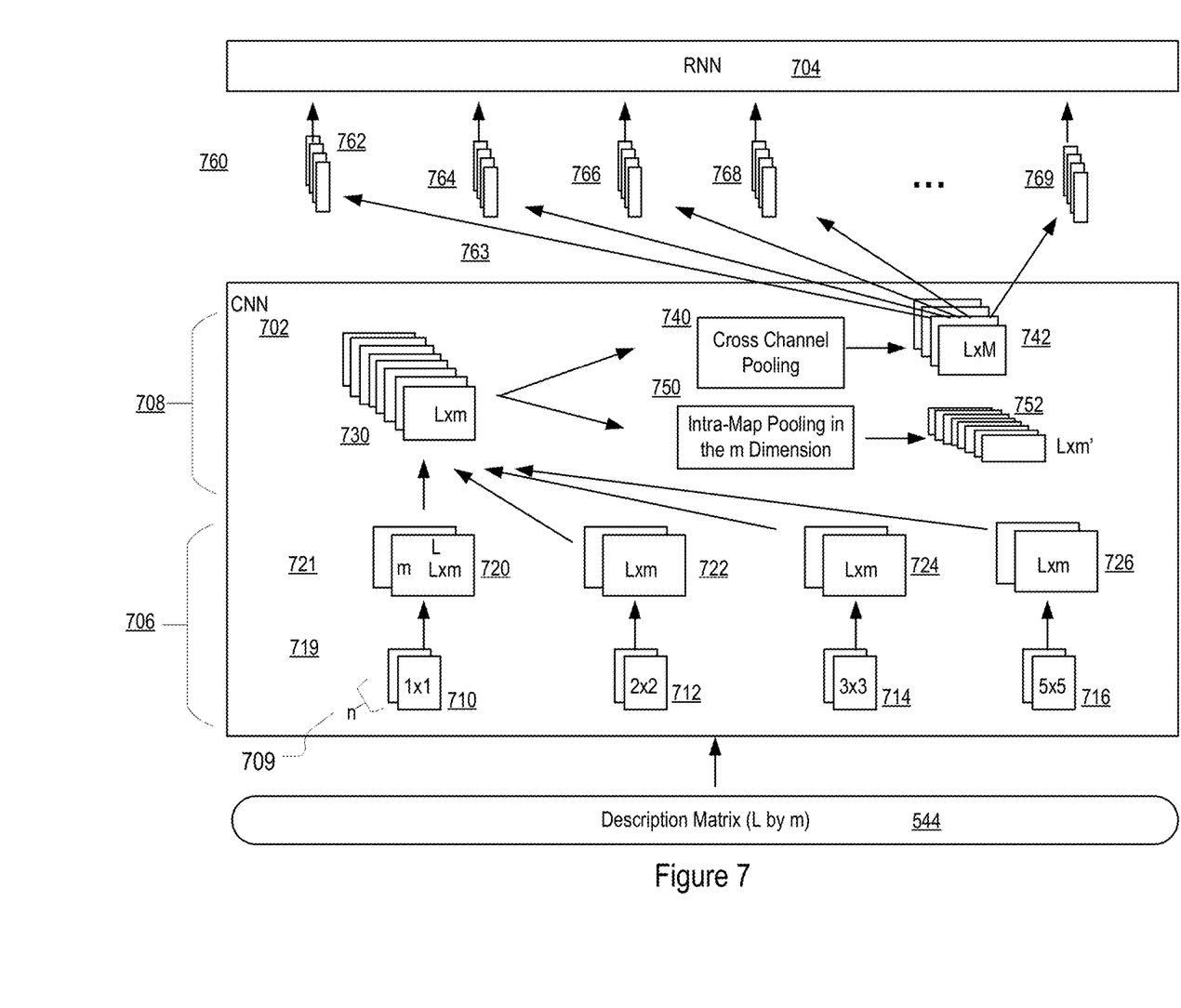
FIG. 7 illustrates a data and logic flow for an exemplary implementation of the convolutional neural network and recurrent neural network of the description processing network of FIG. 5.

FIG. 7 illustrates a data and logic flow for an exemplary implementation of the RCNN 546 within the description processing network 548 of FIG. 5. The RCNN 546 may include a convolutional neural network (CNN) 702 and a recurrent neural network (RNN) 704 that are connected in tandem. The CNN 702 may include multiple convolution layers even though FIG. 7 illustrates data and logic flow for only a single CNN layer. The single CNN layer of FIG. 7 may include, e.g., a first portion 706 for calculating feature maps using learned CNN kernels (alternatively referred to as convolution kernels) and a second portion 708 for pooling and reducing dimensions of the feature maps. When multiple CNN layers are used, the output of the lower CNN layer may be fed into the next layer in which kernel learning and feature map calculation and pooling are repeatedly performed.

The input to the CNN 702 is the character embedding matrix 544 for the description of an information item. Because the embedding matrix 544 is derived by the character embedder 542 of FIG. 5 from one-hot vectors of characters contained in the description of the information item, it does not by itself capture any correlation between characters. These correlations may instead be learned via the CNN 702 via feature extraction and learning implemented by the various CNN layers. These learned features represent correlations on levels including not only words, but also lower level morphemes and higher level phrases.

As such, the CNN 702 may be configured to extract features of characters of various widths. For example, convolution filters or kernels (used interchangeably) of various sizes may be used. As particularly shown in FIG. 7, a set of convolutional filters or kernels 719 including filters of size 1 by 1 (710), 2 by 2 (712), 3 by 3 (714), 5 by 5 (716) and so on may be learned. For the convolutional filters 719 of FIG. 7, for example, there may be n filters for each filter size, as shown by 709. The number of filters n for each filter size may be predetermined and may be the same for all filter sizes. In some other implementation, the numbers of filters between filter sizes may be different. For example, the number of 5 by 5 filters may be different from the number of 2 by 2 filters. In the particular implementation illustrated in FIG. 7, a set of filter sizes $\Omega$ and a number of filters n for each size may be predetermined for a convolutional layer, resulting in the set of filters 719 and a corresponding set of feature maps $F_n^\Omega$ 721, including feature maps 720, 722, 724, and 726.

Each of the feature maps $F_n^\Omega$ 721 is a convolution of the corresponding filter of 719 and the input matrix (for the first CNN layer, the input matrix would be the L by m description matrix 544). In particular, each of the convolutional filters 719 is moved across the input matrix pixel by pixel to obtain a feature map. Wide convolution may be used to ensure that all feature maps maintain a size of L by m.

The implementation of the pooling portion 708 of the CNN 702 in FIG. 7 may utilize a cross-channel pooling process. In particular, the multiple stacks of feature maps 721 (each stack associated with one filter size) may first be concatenated to for a single stack of feature maps. In one implementation, the feature map stacks may be concatenated stack after stack in an order of 720, 722, 724, and 726. In some other implementation, the feature map stacks 720, 722, 724, and 726 may be stacked in any other predetermined order to form the single feature map stack 730. Alternatively, they may be interleaved in any predetermined manner to form the single feature map stack 730. The cross-channel pooling 740 may then be implemented for each pixel location of the concatenated feature map stack 730. The cross-channel pooling may be based on any type of pooling, including but not limited to max pooling, average pooling, and mean pooling. In one example, max pooling of one or more values of a group of values may be implemented. In particular, a predetermined number of max values among feature map values for a specific location in the feature maps 730 (referred to as pixel location of the feature map stack 730) may be retained. For example, among 8 feature maps values for each pixel position (of the L×m pixels) across the concatenated stack 730, four (4) max values of these 8 values may be retained. As such, the feature map stack 730 may be pooled and squashed into a pooled feature map stack 742, having 4 rather than 8 stacks. Such max pooling is cross-channel in that it selects max values from different filter sizes (each filter size is considered a "channel"). The cross-channel pooling from feature maps 730 to obtain feature maps 742 may be specified as a pooling ratio. For example, a ⅛ pooling may denotes reducing the number of stacks of feature maps 730 by a factor of 8 to obtain the pooled feature maps 742 via max pooling, e.g., ⅛ of max values may are selected. In the example above and in FIG. 7, the pooling ratio is ½.

Alternatively or additionally, the feature maps 730 may be pooled using an intra-map pooling process 750 along the m dimension of the feature maps to obtain feature maps 752. Such pooling, for example, may be max pooling of groups of pixels in the m dimension (vertical dimension for the feature maps in FIG. 7) in each of the feature maps 730. As such, the pooled feature maps 752 may be reduced in the m dimension from m to m', as shown in FIG. 7. The CNN layer of CNN 702 may be configured to implement only the cross channel pooling 740, only the intra-map pooling 750, or both. Each CNN layer of multiple CNN layers may be configured separated to implement an independent pooling configuration. As such, the multiple CNN layers may combine to achieve both cross-channel and intra-map pooling, reducing the feature maps both in the m dimension and in the number of feature maps across filter sizes.

The convolution process with cross-channel pooling above helps achieve extraction of global characteristics across local features in the input information item description while such convolution together with intra-map pooling help extract local features. As such, by applying the scheme above to several successive convolutional layers, increasingly higher-level representations of the description input, from characters to morphemes, words, and phrases, may be obtained.

The output of the CNN 702, in the form of feature maps 742/752, may be subsequently input the RNN 704. In one implementation, the feature maps, e.g., 742, may be processed into a sequence of slices (762, 764, 766, 768, and 769) along the L dimension of the feature maps 742 (horizontal dimension of the feature maps in FIG. 7), as shown by the arrows 763 of FIG. 7. Such slices forms the sequence of input for the RNN 704. In one implementation for the RNN 704, single or multilayer LSTM network may be used to compute a series of hidden states. These hidden states, may then be input into the context attention network 548 of FIG. 5 to obtain the description context vector 554. Implementation of the LSTM network and the context attention network for the description processing network 540 (of FIG. 5) may be similar to those used for the numerical word embedding network 520.

The training parameters associated with the CNN 702, the RNN 704, such as the CNN features of various sizes, and the RNN weights in calculating the hidden states, are part of the training parameter set $T_{char}$ for the description processing network 540 of FIG. 5. These parameters are thus learned during the training process for the DNN model as described already above.

In the implementations above, the search query may be embedded into the numerical query context vector using a bi-directional long short term memory technique. The system of claim 1, wherein the title is embedded into the numerical title context vector using a bi-directional long short term memory technique. In the implementations above, a plurality of numerical query context vectors may be transformed into a 1st combined vector. One numerical query context vector of the plurality of numerical query context vectors may be selected based on previous error feedback data during the DNN modeling. In the implementations above, a plurality of numerical title context vectors may be transformed into a 2nd combined vector. One numerical title context vector of the plurality of numerical title context vectors may be selected based on previous error feedback data during the DNN modeling. In the implementations above, a similarity score may further be calculated between the 1st combined vector and the 2nd combined vector prior to computing the similarity measure between the numerical query context vector and the numerical title context vector and the numerical description context vector. In the implementation above, cross-channel pooling of the dimensions of the numerical description context vector may be further performed.

While the implementations disclosed above are described in the context of information searches, the underlying principles are generally applicable to other contexts. For example, the search query above may be any first data element; the information item above may be any second data element; and the user profile may be any profile data item. The deep-learning neural network model discussed above may be similarly used to obtain a relevance score of the first data element with respect to the second data element and the profile data item. The deep-learning neural network model may likewise be trained using data corpus containing historical data and training targets derived from the historical data.

The implementations disclosed above in FIG. 3 through FIG. 7 provide improvements of computing technology in several aspects. For example, rather than using one-hot binary vectors to represent various data, the implementations above uses a combination of one-hot binary vectors and numerical dense vector data structure to achieve reduced computational complexity and speedup in the training process of the deep-leaning neural network model.

The implementations above further provide technical solutions to a problem of providing assessment of relevancy between textual data items contextually and adaptively in view of a set of profile data. The technical components provided by these implementations include various numerical representation transformations, various convolutional neural networks, various recurrent neural networks, and the multilayer perceptron neural networks. The technical solution further includes the novel arrangement of these neural networks in a hierarchical and cascading manner, and in a combination of word and character level representations and feature extraction. The technical solution further provides a cross-channel pooling in additional to intra-map pooling of feature maps in the convolutional neural network to extract both global and local correlations in a dataset.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system for contextual and adaptive information search, comprising:
   a database for storing user profiles;
   a memory for storing a deep-learning neural network model comprising:
      (a) a dense numerical representation network; and
      (b) a multilayer perceptron network; and
   system circuitry in communication with the database and the memory, the system circuitry configured to:
      receive data elements related to a search, the data elements comprising (a) a search query comprising at least one word, (b) an identification of a user issuing the search query, (c) a title of a data item returned from the search based on the search query, and (d) a description of the data item, each of the title and description comprising at least one word;
      obtain a user profile corresponding to the identification of the user from the database;
      using the dense numerical representation network:
         embed the search query into a numerical query context vector of a first predetermined dimension;
         embed the title into a numerical title context vector of a second predetermined dimension;
         embed the description into a numerical description context vector of a third predetermined dimension; and
         embed the user profile into a numerical user profile context vector of a fourth predetermined dimension;
      compute a similarity measure between the numerical query context vector and the numerical title context vector and the numerical description context vector using the dense numerical representation network;
      process the numerical query context vector, the numerical title context vector, the numerical description context vector, the numerical user profile context vector, and the similarity measure as a concatenated input, using the multilayer perceptron network, to obtain a relevance score for the data item returned from the search based on the search query, the relevance score representing relevance of the data item with respect to the search query and the user profile; and
      provide the data item returned from the search based on the search query according to the relevance score,
   wherein the dense numerical representation network comprises a category embedding network for transforming the user profile into a one-hot user profile binary vector of a fifth predetermined dimension and embedding the one-hot user profile binary vector of the fifth predetermined dimension into the numerical user profile context vector of the fourth predetermined dimension, and wherein the fourth predetermined dimension is lower than the fifth predetermined dimension.

2. The system of claim 1, wherein the dense numerical representation network further comprises a numerical word embedding network for converting the search query into a sequence of numerical query word vectors of a sixth predetermined dimension, and a recurrent neural network for embedding the sequence of numerical query word vectors into the numerical query context vector.

3. The system of claim 2, wherein the sixth predetermined dimension is smaller than a size of a vocabulary for the search query.

4. The system of claim 3, wherein the numerical word embedding network is based on word2vec embedding and the sixth predetermined dimension is between 50 and 200.

5. The system of claim 2, wherein the recurrent neural network comprises a plurality of long short term memory cells each corresponding to one of the sequence of numerical query word vectors.

6. The system of claim 2, wherein the numerical word embedding network is further configured to convert the title into a sequence of numerical title word vectors of a seventh predetermined dimension, and wherein the recurrent neural network is further configured for embedding the sequence of numerical title word vectors into the numerical title context vector.

7. The system of claim 1, wherein the dense numerical representation network further comprises a description processing network, the description processing network comprising:
   a character embedder for converting the description into a character sequence of predetermined length via padding and/or cropping and for embedding the character sequence into a sequence of one-hot binary description vectors each corresponding to a character in the character sequence; and a convolutional neural network for converting the sequence of one-hot binary description vectors into the numerical description context vector.

8. The system of claim 7, wherein the description processing network further comprises an recurrent neural network in tandem with the convolutional neural network, the recurrent neural network comprising a plurality of long short term memory nodes.

9. The system of claim 7, wherein the convolutional neural network comprises a plurality of convolution layers, the convolutional layers comprising convolution kernels of at least two different sizes.

10. The system of claim 9, wherein the convolutional neural network comprises at least one convolution layer having a max pooling performed between feature maps associated with the convolution kernels of at least two different sizes.

11. The system of claim 1, wherein the deep-learning neural network model comprises weights associated with the dense numerical representation network and weights associated with the multilayer perceptron network that are trained using a historical search log comprising historical user profile data, historical search queries, historical search results, and historical user click data associated with the historical search results.

12. The system of claim 11, wherein at least one of the weights associated with the dense numerical representation network is used for computing the similarity measure between the numerical query context vector and a concatenation of the numerical title context vector and the numerical description context vector, and is trained based on target similarity measures between the historical search queries and the historical search results according to the historical user click data.

13. The system of claim 11, wherein the weights associated with the dense numerical representation network and weights associated with the multilayer perceptron network are trained using training targets containing positive user-click data according to the historical search log and augmented negative user-click data.

14. The system of claim 1, wherein the data elements related to the search further comprises a ranking and a numerical score for the data item returned from the search based on the search query, and wherein the concatenated input to the multilayer perceptron network further comprises the ranking and the numerical score.

15. The system of claim 1, wherein the search query is embedded into the numerical query context vector using a bi-directional long short term memory technique.

16. The system of claim 1, wherein the title is embedded into the numerical title context vector using a bi-directional long short term memory technique.

17. The system of claim 1, wherein a plurality of numerical query context vectors are transformed into a 1st combined vector.

18. The system of claim 17, wherein one numerical query context vector of the plurality of numerical query context vectors is selected based on previous error feedback data.

19. The system of claim 17, wherein a plurality of numerical title context vectors are transformed into a 2nd combined vector.

20. The system of claim 19, wherein one numerical title context vector of the plurality of numerical title context vectors is selected based on previous error feedback data.

21. The system of claim 19, wherein a similarity score is calculated between the 1st combined vector and the 2nd combined vector prior to computing the similarity measure between the numerical query context vector and the numerical title context vector and the numerical description context vector.

22. The system of claim 1, wherein the system circuitry is configured to perform cross-channel pooling of dimensions of the numerical description context vector.

23. A method for contextual and adaptive information search, comprising:
receiving data elements related to a search, the data elements comprising (a) a search query comprising at least one word, (b) an identification of a user issuing the search query, (c) a title of a data item returned from the search based on the search query, and (d) a description of the data item, each of the title and description comprising at least one word;
obtaining a user profile corresponding to the identification of the user from a database for storing user profiles;
using a dense numerical representation network:
embedding the search query into a numerical query context vector of a first predetermined dimension;
embedding the title into a numerical title context vector of a second predetermined dimension;
embedding the description into a numerical description context vector of a third predetermined dimension; and
embedding the user profile into a numerical user profile context vector of a fourth predetermined dimension;
computing a similarity measure between the numerical query context vector and the numerical title context vector and the numerical description context vector using the dense numerical representation network;
processing a concatenated input comprising the numerical query context vector, the numerical title context vector, and numerical description context vector, the numerical user profile context vector, and the similarity measure, using a multilayer perceptron network, to obtain a relevance score for the data item returned from the search based on the search query, the relevance score representing relevance of the data item with respect to the search query and the user profile; and
providing the data item returned from the search based on the search query according to the relevance score,
wherein the dense numerical representation network comprises:
a category embedding network for transforming the user profile into a one-hot user profile binary vector of a fifth predetermined dimension and embedding the one-hot user profile binary vector of the fifth predetermined dimension into the numerical user profile context vector of the fourth predetermined dimension, and wherein the fourth predetermined dimension is lower than the fifth predetermined dimension;
a numerical word embedding network for converting the search query into a sequence of numerical query word vectors of a sixth predetermined dimension; and
a recurrent neural network for embedding the sequence of numerical query word vectors into the numerical query context vector;
wherein the sixth predetermined dimension is smaller than a size of a vocabulary for the search query;
wherein the recurrent neural network comprises a plurality of long short term memory cells;

wherein the numerical word embedding network is further configured to convert the title into a sequence of numerical title word vectors of a seventh predetermined dimension; and wherein the recurrent neural network is further configured to embed the sequence of numerical title word vectors into the numerical title context vector.

24. The method of claim 23, wherein the dense numerical representation network further comprises description processing network comprising:

a character embedder for converting the description into a character sequence of predetermined length via padding and/or cropping and for embedding the character sequence into a sequence of one-hot binary description vectors each corresponding to a character in the character sequence; and a convolutional neural network for converting the sequence of one-hot binary description vectors into the numerical description context vector, wherein the convolutional neural network comprises convolution kernels of at least two different sizes.

25. The method of claim 23, wherein the dense numerical representation network and the multilayer perceptron network are associated with trainable weights trained using a historical search log comprising historical user profile data, historical search queries, historical search results, and historical user click data associated with the historical search results;

wherein at least one of the trainable weights associated with the dense numerical representation network is used for computing the similarity measure between the numerical query context vector and a concatenation of the numerical title context vector and the numerical description context vector, and is trained based on target similarity measures between the historical search queries and the historical search results according to the historical user click data; and wherein the trainable weights associated with the multilayer perceptron network are trained based on target relevance scores derived from the historical search queries, the historical search results, the historical user profile data, and the historical user click data.

26. A system comprising:

a database for storing profile data items;

a memory for storing a deep-learning neural network model comprising:

(a) a dense numerical representation network; and (b) a multilayer perceptron network, wherein the deep-learning neural network model includes at least one convolutional neural network and at least one recurrent neural network; and system circuitry in communication with the database and the memory, the system circuitry configured to:

receive data elements comprising (a) a first data element comprising at least one word, (b) an identification associated with the first data element, (c) a title associated with a second data element; and (d) a description associated with the second data element, each of the title and description comprising at least one word;

obtain a profile data item corresponding to the identification associated with the first data element from the database;

using the dense numerical representation network:

embed the first data element into a first numerical context vector of a first predetermined dimension based on a word representation;

embed the title into a second numerical context vector of a second predetermined dimension based on the word representation; and embed the description into a third numerical context vector of a third predetermined dimension based on a character representation; and embed the profile data item into a fourth numerical context vector of a fourth predetermined dimension based on a category representation;

compute a similarity measure between the first numerical context vector and the second numerical context vector and the third numerical context vector using the dense numerical representation network;

process the first numerical context vector, the second numerical context vector, the third numerical context vector, the fourth numerical context vector, and the similarity measure as a concatenated input, using the multilayer perceptron network, to obtain a relevance score for the second data element, the relevance score representing relevance of the second data element with respect to the first data element and the profile data item; and provide the second data element according to the relevance score, wherein the dense numerical representation network comprises a category embedding network for transforming the profile data item into a one-hot profile binary vector of a fifth predetermined dimension and embedding the one-hot profile binary vector of the fifth predetermined dimension into the fourth numerical context vector of the fourth predetermined dimension, and wherein the fourth predetermined dimension is lower than the fifth predetermined dimension.

27. A system for contextual and adaptive information search, comprising:

a database for storing user profiles;

a memory for storing a deep-learning neural network model comprising:

(a) a dense numerical representation network; and (b) a multilayer perceptron network; and system circuitry in communication with the database and the memory, the system circuitry configured to:

receive data elements related to a search, the data elements comprising (a) a search query comprising at least one word, (b) an identification of a user issuing the search query, (c) a title of a data item returned from the search based on the search query, and (d) a description of the data item, each of the title and description comprising at least one word;

obtain a user profile corresponding to the identification of the user from the database;

using the dense numerical representation network:

embed the search query into a numerical query context vector of a first predetermined dimension;

embed the title into a numerical title context vector of a second predetermined dimension;

embed the description into a numerical description context vector of a third predetermined dimension; and embed the user profile into a numerical user profile context vector of a fourth predetermined dimension;

compute a similarity measure between the numerical query context vector and the numerical title context vector and the numerical description context vector using the dense numerical representation network;

process the numerical query context vector, the numerical title context vector, the numerical description context vector, the numerical user profile context vector, and the similarity measure as a concatenated input, using the multilayer perceptron network, to obtain a relevance score for the data item returned from the search based on the search query, the relevance score representing relevance of the data item with respect to the search query and the user profile; and provide the data item returned from the search based on the search query according to the relevance score, wherein the dense numerical representation network comprises a description processing network, the description processing network comprising:

a character embedder for converting the description into a character sequence of predetermined length via padding and/or cropping and for embedding the character sequence into a sequence of one-hot binary description vectors each corresponding to a character in the character sequence; and a convolutional neural network for converting the sequence of one-hot binary description vectors into the numerical description context vector.

28. A method for contextual and adaptive information search, comprising:

receiving data elements related to a search, the data elements comprising (a) a search query comprising at least one word, (b) an identification of a user issuing the search query, (c) a title of a data item returned from the search based on the search query, and (d) a description of the data item, each of the title and description comprising at least one word;

obtaining a user profile corresponding to the identification of the user from a database for storing user profiles;

using a dense numerical representation network:

embedding the search query into a numerical query context vector of a first predetermined dimension;

embedding the title into a numerical title context vector of a second predetermined dimension;

embedding the description into a numerical description context vector of a third predetermined dimension; and embedding the user profile into a numerical user profile context vector of a fourth predetermined dimension;

computing a similarity measure between the numerical query context vector and the numerical title context vector and the numerical description context vector using the dense numerical representation network;

processing a concatenated input comprising the numerical query context vector, the numerical title context vector, and numerical description context vector, the numerical user profile context vector, and the similarity measure, using a multilayer perceptron network, to obtain a relevance score for the data item returned from the search based on the search query, the relevance score representing relevance of the data item with respect to the search query and the user profile; and providing the data item returned from the search based on the search query according to the relevance score, wherein the dense numerical representation network comprises description processing network comprising:

a character embedder for converting the description into a character sequence of predetermined length via padding and/or cropping and for embedding the character sequence into a sequence of one-hot binary description vectors each corresponding to a character in the character sequence; and a convolutional neural network for converting the sequence of one-hot binary description vectors into the numerical description context vector, wherein the convolutional neural network comprises convolution kernels of at least two different sizes.

29. A method for contextual and adaptive information search, comprising:

receiving data elements related to a search, the data elements comprising (a) a search query comprising at least one word, (b) an identification of a user issuing the search query, (c) a title of a data item returned from the search based on the search query, and (d) a description of the data item, each of the title and description comprising at least one word;

obtaining a user profile corresponding to the identification of the user from a database for storing user profiles;

using a dense numerical representation network:

embedding the search query into a numerical query context vector of a first predetermined dimension;

embedding the title into a numerical title context vector of a second predetermined dimension;

embedding the description into a numerical description context vector of a third predetermined dimension; and embedding the user profile into a numerical user profile context vector of a fourth predetermined dimension;

computing a similarity measure between the numerical query context vector and the numerical title context vector and the numerical description context vector using the dense numerical representation network;

processing a concatenated input comprising the numerical query context vector, the numerical title context vector, and numerical description context vector, the numerical user profile context vector, and the similarity measure, using a multilayer perceptron network, to obtain a relevance score for the data item returned from the search based on the search query, the relevance score representing relevance of the data item with respect to the search query and the user profile; and providing the data item returned from the search based on the search query according to the relevance score, wherein the dense numerical representation network and the multilayer perceptron network are associated with trainable weights trained using a historical search log comprising historical user profile data, historical search queries, historical search results, and historical user click data associated with the historical search results;

wherein at least one of the trainable weights associated with the dense numerical representation network is used for computing the similarity measure between the numerical query context vector and a concatenation of the numerical title context vector and the numerical description context vector, and is trained based on target similarity measures between the historical search queries and the historical search results according to the historical user click data; and wherein the trainable weights associated with the multilayer perceptron network are trained based on target relevance scores derived from the historical search queries, the historical search results, the historical user profile data, and the historical user click data.

* * * * *